W. H. BRISTOL.
BELT FASTENER.
APPLICATION FILED FEB. 27, 1911.
1,000,149.
Patented Aug. 8, 1911.
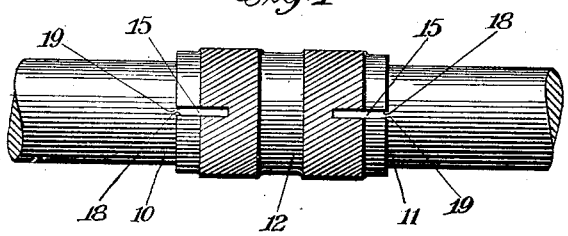
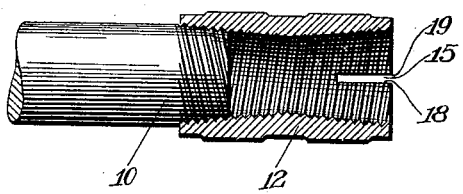  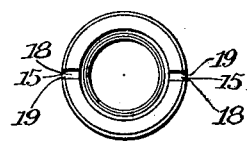
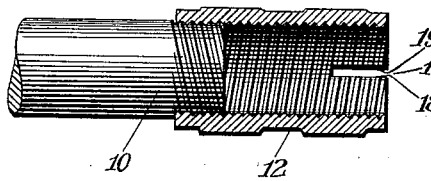  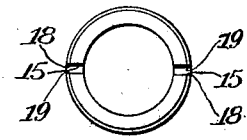
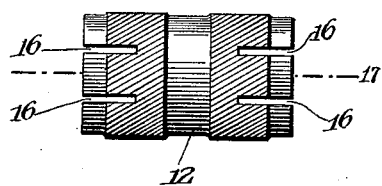  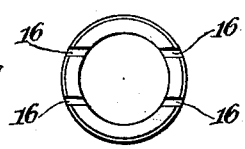
Witnesses.
John E. Prager
A. Worden. Gibbs.
William H. Bristol Inventor
By his Attorney

UNITED STATES PATENT OFFICE.

WILLIAM H. BRISTOL, OF WATERBURY, CONNECTICUT.

BELT-FASTENER.

1,000,149. Specification of Letters Patent. Patented Aug. 8, 1911.

Application filed February 27, 1911. Serial No. 611,082.

*To all whom it may concern:*

Be it known that I, WILLIAM H. BRISTOL, a citizen of the United States, and a resident of Waterbury, in the county of New Haven and State of Connecticut, have invented certain new and useful Improvements in Belt-Fasteners, of which the following is a specification.

The invention relates to belt fasteners, and more particularly to a belt fastener adapted for use in connection with round belts.

It has for its object a fastener for belts of this character into which the abutting belt ends may be securely threaded; and to provide means in connection with said fastener wherewith a thread may be cut upon the said belt ends simultaneously with their insertion into the fastener; also, to provide means to prevent the unscrewing of the ends after the same have been threaded in the fastener.

In the accompanying drawings which illustrate the invention, and in which similar characters of reference designate corresponding parts throughout the several views—Figure 1 is a plan view showing two abutting belt ends joined by means of the improved fastener. Fig. 2 is a longitudinal section through the fastener, with one of the belt ends fitted therein. Fig. 3 is an end view looking into the fastener. Fig. 4 is a longitudinal section of a fastener having a uniform internal diameter, and shows also a corresponding belt end fitted therein. Fig. 5 is an end view, looking into the fastener shown in Fig. 4. Fig. 6 is a plan of the fastener, illustrating a modification. Fig. 7 is an end view, looking into the fastener shown in Fig. 6.

Referring now to the drawings, 10 and 11 designate the abutting belt ends which it is desired to join by means of the improved fastener 12, as shown in Fig. 1. This fastener consists essentially of a tube or sleeve open at both ends and threaded internally. The thread may be either tapering from both ends toward the center, as shown in Fig. 2; or, may be of uniform diameter, as shown in Fig. 4. In either case, the belt ends 10 and 11 are screwed into the respective openings of the fastener by correspondingly turning said ends with respect to the said fastener in well-known manner. To assist in this insertion, by simultaneously cutting a thread on said belt ends, a pair of slots 15 are provided at each end of the fastener, Figs. 1 to 5, and extend inwardly from the outer edges of the same. Or, two pair of slots 16 may be provided at each end, and shown in Figs. 6 and 7 as located equidistantly from the center line 17 of the fastener. These slots afford cutting corners 18 and 19, the former acting to cut a thread upon the ends 10 and 11 of the belt as the same are screwed into the fastener; and the latter acting in the reverse manner to prevent the unscrewing of the belt from the fastener by tending to embed themselves within the threads of the belt ends.

The fastener herein set forth may be very readily and inexpensively constructed, and affords a most efficient means for securing the abutting ends of a round belt to each other.

I claim:—

1. As a belt fastener for round belts: an internally threaded sleeve open at both ends to receive the ends of the belt to be joined, and provided with a slot extending inwardly from each end, affording a cutting edge to cut a thread upon said belt ends as the same are turned into the belt fastener.

2. As a belt fastener for round belts: a sleeve open at both ends to receive the ends of the belt to be joined and provided with an internal thread tapering inwardly toward the center from each end, said sleeve being further provided with a slot extending inwardly from each end and affording a cutting edge to cut a thread upon said belt ends as the same are turned into the belt fastener.

Signed at New York, in the county of New York and State of New York this 24th day of February A. D. 1911.

WILLIAM H. BRISTOL.

Witnesses:
JEANNETTE STORK,
FREDK. F. SCHUETZ.

Copies of this patent may be obtained for five cents each, by addressing the "Commissioner of Patents, Washington, D. C."